United States Patent [19]

Bregović et al.

[11] 4,382,577
[45] May 10, 1983

[54] SHUT-OFF VALVE FOR LIQUID OR GASEOUS FLUIDS

[76] Inventors: Josip Bregović, Vramčeva 17, YU-41000 Zagreb; Josip Valic, Krizni rat 37, YU-58450 Hvar, both of Yugoslavia

[21] Appl. No.: 270,865

[22] Filed: Jun. 5, 1981

[30] Foreign Application Priority Data

Jun. 11, 1980 [YU] Yugoslavia .......................... 1558/80

[51] Int. Cl.³ .......................................... F16K 31/383
[52] U.S. Cl. .......................................... 251/43; 251/33
[58] Field of Search ..................... 251/43, 46, 44, 33

[56] References Cited

U.S. PATENT DOCUMENTS

| | | | |
|---|---|---|---|
| 457,005 | 8/1891 | McNeil | 251/43 X |
| 1,146,012 | 7/1915 | Mason | 251/42 X |
| 1,571,396 | 2/1926 | Darrow | 251/44 |
| 2,328,323 | 8/1943 | Bowers et al. | 251/46 X |
| 2,655,172 | 10/1953 | Owens | 251/43 X |
| 3,206,158 | 9/1965 | Bloomquist | 251/43 X |
| 4,108,419 | 8/1978 | Sturman et al. | 251/46 X |

*Primary Examiner*—Arnold Rosenthal
*Attorney, Agent, or Firm*—Karl F. Ross

[57] ABSTRACT

A valve housing with a horizontal partition between an inlet port and an outlet port coacts with a hollow plunger which is vertically displaceable above that partition and has a lower end fitting into an aperture thereof traversed in an upward direction by an incoming fluid. The plunger is guided in a surrounding sleeve threadedly connected at its bottom with the valve housing and at its top with a cap having a boss traversed by a stem which is integral with a control handle threaded onto that boss. The lower end of the stem adjoins an elastic membrane which is clamped between the cap and the sleeve and which bounds a fluid space above an end wall of the sleeve; this space permanently communicates via channels in the sleeve and external flutes in the plunger with the outlet port of the housing and is further connected through a tubular neck of that end wall with the interior of the plunger and thus with the inlet port when the membrane is lifted off this neck. In such a case the pressure of the incoming fluid, acting upon an internal shoulder of the plunger, raises the latter off the partition to establish a direct flow path between the two ports. When the stem is lowered to let the membrane obstruct the neck of the sleeve wall, the plunger returns by hydraulic pressure to its flow-blocking position.

8 Claims, 1 Drawing Figure

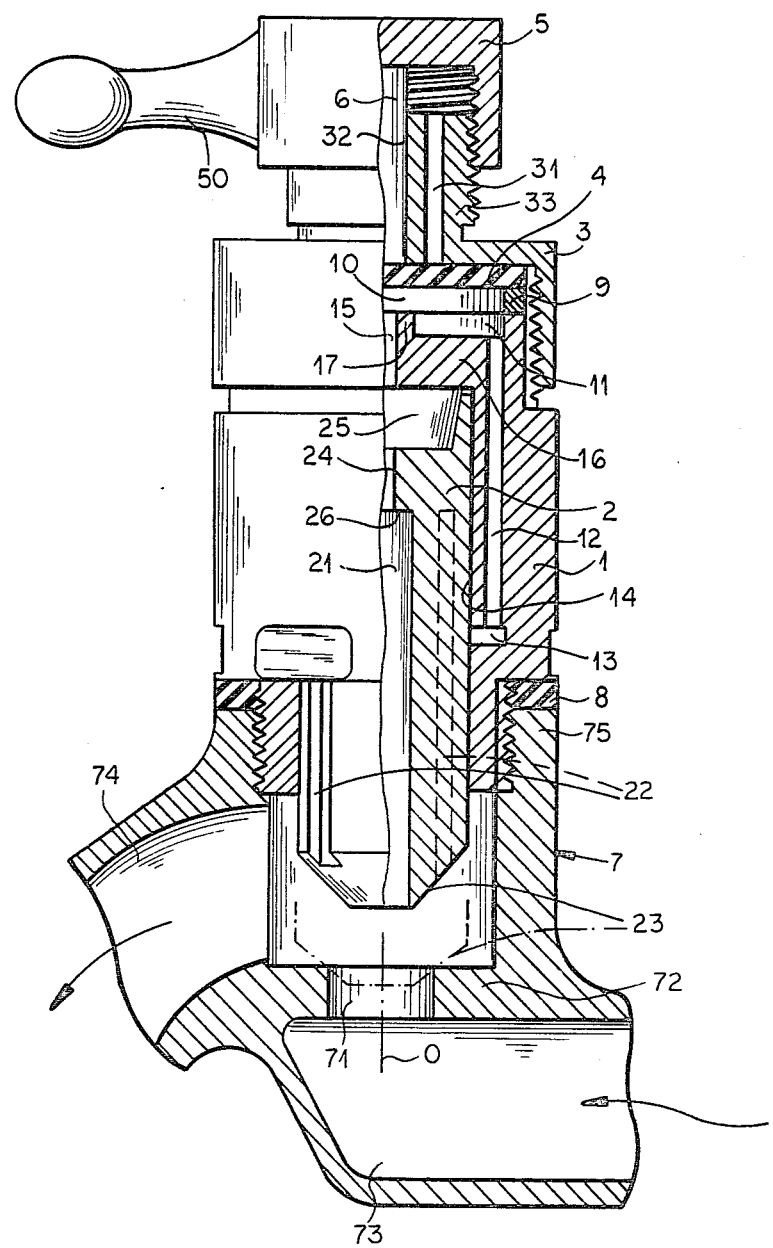

SHUT-OFF VALVE FOR LIQUID OR GASEOUS FLUIDS

FIELD OF THE INVENTION

Our present invention relates to a shut-off valve for the control of the flow of a liquid or gaseous fluid between two conduits respectively terminating at an inlet port and at an outlet port of a valve housing.

BACKGROUND OF THE INVENTION

Conventional valves of this type, using a valve body which can be lowered or raised by a spindle in order to block or unblock a flow path between the inlet and outlet ports, tend to become leaky upon prolonged use on account of excessive wear of coacting surfaces and/or the accumulation of sediments along the edge of the valve seat. This generally requires the replacement of rubber gaskets or other parts of the assembly if not of the entire valve itself. In some instances, in which the valve housing is integrated in a larger structure, such replacement may be difficult or impossible.

OBJECT OF THE INVENTION

The object of our present invention, therefore, is to provide an improved shut-off valve which avoids the aforestated drawbacks.

SUMMARY OF THE INVENTION

A valve according to our invention, whose housing contains a usually horizontal partition separating its inlet and outlet ports from each other and having an aperture positioned to be traversed by the fluid from a first side to a second side (usually in an upward direction), comprises a plunger which is guided in a housing extension and has an extremity partly receivable in that aperture for fluidically isolating the two ports from each other in a cut-off position, this plunger further having a throughgoing axial bore with an internal constriction. A transverse wall formed by the housing extension, disposed beyond (e.g. above) the plunger, has a passage in line with the bore thereof which opens into a space beyond that wall, this space communicating with the outlet port via a bypass which is independent of the aperture closable by the plunger and which includes one or more channels in the housing extension whereby incoming fluid entering the plunger bore from the inlet port through the partition aperture and reaching the outlet port by way of the bypass channel or channels creates a pressure differential in the internal plunger holes tending to move the plunger off the partition and to establish a direct connection between the two ports. This pressure differential, however, can be substantially eliminated by blocking means in the space above the transverse wall operable to throttle the passage of that wall, or to obstruct it completely, so as to allow the plunger to return to its cut-off position by hydraulic pressure.

Pursuant to another feature of our invention, the plunger is formed at its end opposite its aperture-closing extremity with a recess whose diameter exceeds that of the partition aperture and which confronts the end wall of the housing extension for exerting a retaining pressure upon the plunger in its cut-off position and upon substantial obstruction of the passage of that end wall by the aforementioned blocking means. This insures that the plunger will remain firmly seated in the partition aperture until a deactivation of the blocking means vents the plunger recess to the outlet port so as to reestablish the valve-opening pressure differential.

Advantageously, in accordance with a more particular feature of our invention, the blocking means comprises a flexible and preferably elastic membrane lying close to a tubular neck of the end wall which forms the passage thereof and which is surrounded by an annular depression communicating with the bypass channel or channels, a stem on the opposite side of the membrane being axially reciprocable for either deforming the membrane into a passage-throttling position or allowing it to yield to the countervailing pressure of the fluid in the interior of the plunger.

BRIEF DESCRIPTION OF THE DRAWING

The above and other features of our invention will now be described in detail with reference to the accompanying drawing the sole FIGURE of which is an elevational view, partly in section, of a shut-off valve embodying the present improvement.

SPECIFIC DESCRIPTION

As shown in the drawing, a valve housing 7 has an inlet port 73 and an outlet port 74 separated by a horizontal partition 72 having an aperture 71 centered on a vertical axis O. An upward extension 1 of housing 7 forms a sleeve for the vertical guidance of a plunger 2 with a tapered lower end 23 receivable in partition aperture 71. Plunger 2 has a throughgoing axial bore 21 with a constriction 24 forming an internal shoulder 26, that constriction opening into a widened recess 25 at the top of the plunger whose inner diameter greatly exceeds that of aperture 71. Recess 25 confronts a transverse end wall 16 of guide sleeve 1 which has an upstanding tubular neck 17 with a passage 15 forming a coaxial extension of plunger bore 21. Neck 17 is surrounded by an annular depression 11 which continuously communicates by way of several peripherally distributed vertical channels 12 (only one shown) with a ring groove 13 that opens onto the inner sleeve periphery 14. The outer surface of plunger 2 is provided with several peripherally disposed vertical flutes 22 which terminate at its tapered end 23, beyond the circumference of aperture 71, and are of sufficient length to communicate with groove 13 in every plunger position.

The bottom end of sleeve 1 is screwed into a flange 75 of housing 7 with interposition of a rubber gasket 8. Its upper end is threadedly engaged by a cap 3 integral with a tubular boss 33 having external threads which are matingly engaged by internal threads of a hub 5 forming part of a handle 50. A central bore 32 of boss 33 is traversed by a stem 6 which may simply float in that bore but could also be secured to hub 5. The wall of boss 33 has several peripherally distributed outlying bores 37 (only one shown) connecting the interior of the hub with the interior of cap 3.

A membrane 4, of rubber or other elastic material compatible with the fluid to be controlled, is peripherally clamped between end cap 3 and a spacer ring 9 resting on the top of sleeve 1. In the illustrated position of handle 50, in which the stem 6 is fully withdrawn into the boss 33 whose underside is contacted by membrane 4, a fluid space 10 below that membrane opens into the axial passage 15 of neck 17 as well as into the channels 12 of sleeve 1 so as to establish a bypass through which fluid entering the bore 21 via port 73 and aperture 71 can flow via recess 25, passage 15, space 10, depression 11, channels 12, groove 13 and flutes 22 to outlet port 74. With suitable dimensioning of the overall cross-section of this bypass, a sufficient pressure differential will exist across the constriction 24 to elevate the plunger 2 from its cut-off position (indicated in dot-dash lines) into its illustrated through-flow position in which its recessed top abuts the wall 16.

If the user wishes to close the valve, handle 50 is rotated in a direction (e.g. clockwise) such that stem 6 depresses the center of membrane 4; additional downward pressure is exerted upon the membrane by the air trapped inside hub 5 passing through the outlying bores 31. As the membrane approaches the neck 17, the bypass described above is at least partly obstructed so that the pressure differential across constriction 24 substantially increases. This enables the plunger 2 to return to the cut-off position in which fluid begins to accumulate in recess 25 so as to exert upon the plunger a downward pressure exceeding the upward pressure which acts upon shoulder 26 and upon the accessible area of its lower end 23. This cut-off position will therefore be maintained under the user rotates the handle 50 in the reverse direction (e.g. counterclockwise) to relieve the fluid pressure in recess 25.

Although our preferred embodiment uses a vertical plunger, the same principle can be applied to a valve of any orientation.

We claim:

1. A shut-off valve for controlling the flow of a fluid between two conduits, comprising:
    a housing with an inlet port and an outlet port respectively connectable to said conduits, said ports being separated in said housing by a partition having an aperture positioned to be traversed by the fluid from a first side to a second side;
    a plunger guided in an extension of said housing on said second side of said partition, said plunger having an extremity partly receivable in said aperture for fluidically isolating said ports from each other in a cut-off position, said plunger further having a throughgoing axial bore with an internal constriction;
    a transverse wall in said extension beyond said plunger, said wall having a passage in line with said bore opening into a space beyond said wall, said space communicating with said outlet port via a bypass independent of said aperture including at least one channel in said extension and a set of external flutes on said plunger which open onto said extremity outside the circumference of said aperture whereby incoming fluid entering said bore from said inlet port through said aperture and reaching said outlet port by way of said channel creates a pressure differential across said internal constriction tending to move said plunger off said partition and establishing a direct connection between said ports; and
    blocking means in said space operable to throttle said passage for allowing a return of said plunger to said cut-off position by a hydraulic pressure permanently acting thereon.

2. A shut-off valve as defined in claim 1 wherein said plunger has an end opposite said extremity formed with a recess of a diameter greater than that of said aperture confronting said transverse wall for exerting a retaining pressure upon said plunger in said cut-off position upon substantial obstruction of said passage by said blocking means.

3. A shut-off valve as defined in claim 1 or 2 wherein said transverse wall has a tubular neck forming said passage, said neck being surrounded by an annular depression communicating with said channel.

4. A shut-off valve as defined in claim 3 wherein said blocking means comprises a flexible membrane close to said neck and an axially reciprocable stem adjoining said membrane on a side thereof opposite said neck.

5. A shut-off valve as defined in claim 4 wherein said extension comprises a sleeve and an end cap threadedly secured to said sleeve, said membrane being clamped between said sleeve and said end cap.

6. A shut-off valve as defined in claim 5 wherein said end cap is provided with a tubular boss threadedly engaged by a handle with a hub bearing upon said stem, the latter traversing said boss.

7. A shut-off valve for controlling the flow of a fluid between two conduits, comprising:
    a housing with an inlet port and an outlet port respectively connectable to said conduits, said ports being separated in said housing by a partition having an aperture positioned to be traversed by the fluid from a first side to a second side;
    a plunger guided in a sleeve forming an extension of said housing on said second side of said partition, said plunger having an extremity partly receivable in said aperture for fluidically isolating said ports from each other in a cut-off position, said plunger further having a throughgoing axial bore with an internal constriction;
    a transverse wall in said extension beyond said plunger, said wall being provided with a tubular neck forming a passage in line with said bore opening into a space beyond said wall, said space communicating with said outlet port via a bypass independent of said aperture including at least one channel in said sleeve, said neck being surrounded by an annular depression communicating with said channel whereby incoming fluid entering said bore from said inlet port through said aperture and reaching said outlet port by way of said channel creates a pressure differential across said internal constriction tending to move said plunger off said partition and establishing a direct connection between said ports;
    an end cap threadedly secured to said sleeve and provided with a tubular boss; and
    blocking means in said space operable to throttle said passage for allowing a return of said plunger to said cut-off position by a hydraulic pressure permanently acting thereon, said blocking means including a flexible membrane clamped between said sleeve and said end cap, a stem axially slidable in said boss on the side of said membrane opposite said neck and a handle with a hub threaded onto said boss in contact with said stem for optionally deflecting said membrane by means of said stem onto said neck.

8. A shut-off valve as defined in claim 1, 2 or 7 wherein said extremity is tapered.

* * * * *